US010721088B2

(12) United States Patent
Saxena et al.

(10) Patent No.: US 10,721,088 B2
(45) Date of Patent: Jul. 21, 2020

(54) MULTI-MODAL INTERACTIVE HOME-AUTOMATION SYSTEM

(71) Applicant: BrainofT Inc., Redwood City, CA (US)

(72) Inventors: Ashutosh Saxena, San Mateo, CA (US); Lukas Kroc, Redwood City, CA (US); Yu Zhou, Newark, CA (US); Deng Deng, Mountain View, CA (US)

(73) Assignee: BrainofT Inc., Redwood City, CA (US)

( * ) Notice: Subject to any disclaimer, the term of this patent is extended or adjusted under 35 U.S.C. 154(b) by 53 days.

(21) Appl. No.: 15/985,397

(22) Filed: May 21, 2018

(65) Prior Publication Data

US 2018/0343139 A1    Nov. 29, 2018

Related U.S. Application Data

(60) Provisional application No. 62/510,158, filed on May 23, 2017.

(51) Int. Cl.
| H04L 12/28 | (2006.01) |
| G05B 19/042 | (2006.01) |
| G05B 15/02 | (2006.01) |
| G05B 19/04 | (2006.01) |

(52) U.S. Cl.
CPC ........... *H04L 12/282* (2013.01); *G05B 15/02* (2013.01); *G05B 19/04* (2013.01); *G05B 19/0426* (2013.01); *H04L 12/2823* (2013.01); *G05B 2219/15117* (2013.01); *G05B 2219/25198* (2013.01); *G05B 2219/2642* (2013.01); *H04L 2012/285* (2013.01)

(58) Field of Classification Search
CPC ............... H04L 12/282; H04L 12/2823; H04L 2012/285; G05B 19/0426; G05B 15/02; G05B 19/04; G05B 2219/15117; G05B 2219/25198; G05B 2219/2642

See application file for complete search history.

(56) References Cited

U.S. PATENT DOCUMENTS

| 5,945,837 | A | * | 8/1999 | Fredrickson | ....... | G01R 1/07307 |
| | | | | | | 324/754.08 |
| 6,032,867 | A | * | 3/2000 | Dushane | ............ | G05D 23/1904 |
| | | | | | | 236/46 R |
| 9,353,965 | B1 | * | 5/2016 | Goyal | ...................... | G06F 3/011 |
| 9,905,122 | B2 | * | 2/2018 | Sloo | ................... | G06K 9/00744 |
| 2008/0142241 | A1 | * | 6/2008 | Herth | ...................... | H02G 3/12 |
| | | | | | | 174/53 |
| 2010/0106306 | A1 | * | 4/2010 | Simon | ................ | H05B 37/0227 |
| | | | | | | 700/276 |
| 2010/0298957 | A1 | | 11/2010 | Sanchez Rocha et al. | | |

(Continued)

*Primary Examiner* — Thomas C Lee
*Assistant Examiner* — Charles Cai
(74) *Attorney, Agent, or Firm* — Shun Yao; Park, Vaughan, Fleming & Dowler LLP

(57) ABSTRACT

One embodiment can provide a home-automation system. The home-automation device can include a mechanical supporting structure and a plurality of components mechanically coupled to the mechanical supporting structure. The plurality of components can include a central controller, one or more printed circuit boards (PCBs), and a plurality of sensors mounted on the one or more PCBs. The central controller can be configured to detect a user event based on output from multiple sensors, with each sensor being configured to sense parameters in a different physical domain.

19 Claims, 17 Drawing Sheets

(56) References Cited

U.S. PATENT DOCUMENTS

| | | | |
|---|---|---|---|
| 2011/0295430 A1* | 12/2011 | Kouninski | G05D 23/1906 700/278 |
| 2013/0099009 A1* | 4/2013 | Filson | G05D 23/1902 236/1 C |
| 2013/0338839 A1* | 12/2013 | Rogers | G05D 23/1904 700/278 |
| 2015/0096352 A1* | 4/2015 | Peterson | H04M 1/72561 73/31.02 |
| 2015/0228419 A1* | 8/2015 | Fadell | G08B 17/00 307/112 |
| 2015/0347348 A1* | 12/2015 | Gouw | G06F 13/4221 710/313 |
| 2016/0195856 A1 | 7/2016 | Spero | |
| 2016/0323118 A1 | 11/2016 | DiPoala | |
| 2018/0124903 A1* | 5/2018 | Strods | H04Q 9/00 |
| 2018/0306609 A1* | 10/2018 | Agarwal | H04L 67/12 |

\* cited by examiner

MULTI-MODAL INTERACTIVE HOME-AUTOMATION SYSTEM

RELATED APPLICATION

This application claims the benefit of U.S. Provisional Application No. 62/510,158, entitled "SUPER SENSOR," by inventors Ashutosh Saxena and Lukas Kroc, filed 23 May 2017, the disclosure of which is incorporated herein by reference in its entirety.

BACKGROUND

Field

This disclosure is generally related to home-automation devices. More specifically, this disclosure is related to a wall-mounted device that includes multiple sensors for providing a wide range of smart features.

Related Art

Home automation, or smart homes, has enhanced quality of life of their users. More specifically, a home-automation system enables centralized control of lighting, HVAC (heating, ventilation, and air conditioning), appliances, and other systems, thus providing improved convenience, comfort, energy efficiency, and security. Some automation systems provide a way to automate the control of a device based on timed or environmental factors, such as in an HVAC unit or a sprinkler system. However, currently available home-automation systems, such as Amazon Alexa™ (trademark of Amazon.com, Inc., of Seattle, Wash.), can only provide a small number of smart features.

SUMMARY

One embodiment can provide a home-automation system. The home-automation system can include a mechanical supporting structure and a plurality of components mechanically coupled to the mechanical supporting structure. The plurality of components can include a central controller, one or more printed circuit boards (PCBs), and a plurality of sensors mounted on the one or more PCBs. The central controller can be configured to detect a user event based on output from multiple sensors, with each sensor being configured to sense parameters in a different physical domain.

In a variation on this embodiment, the mechanical supporting structure can include a physical enclosure that encloses the plurality of components.

In a variation on this embodiment, the central controller can include a single-board computer mounted on a back surface of the mechanical supporting structure.

In a variation on this embodiment, the home-automation system can further include at least one speaker. The one or more PCBs can include a main PCB and a daughter PCB; the mechanical supporting structure can include a cover plate; and the main PCB, the daughter PCB, and the speaker can be mounted on the cover plate.

In a variation on this embodiment, the plurality of sensors can include one or more of: a passive infrared (PIR) sensor, a camera, an ambient light sensor, one or more microphones, and a temperature-and-humidity sensor.

In a variation on this embodiment, the plurality of components can further include one or more of: a plurality of red-green-blue light-emitting diodes and at least one infrared light-emitting diode.

In a variation on this embodiment, at least one PCB can include one or more of: a general-purpose input-output (GPIO) header comprising a plurality of GPIO pins, one or more Ethernet connectors, an inter-integrated circuit ($I^2C$) breakout, and a mezzanine PCB connector.

In a variation on this embodiment, the home-automation system can further include a front panel, which can include a plurality of openings for exposing the plurality of sensors.

In a variation on this embodiment, while detecting the user event, the central controller can be configured to perform at least one of: detecting a user presence, recognizing a face, recognizing a voice, detecting an environment state, recognizing an event, detecting a status of an appliance, and detecting a user activity.

In a variation on this embodiment, while detecting the user event, the central controller can be configured to analyze output of at least a sound sensor and a light sensor.

In a further variation, while detecting the user event, the central controller can be further configured to analyze output of a passive infrared (PIR) sensor.

In a variation on this embodiment, while detecting the user event, the central controller can be configured to apply a machine-learning technique.

In a variation on this embodiment, the central controller can be configured to control an in-home device based on one or more detected user events.

In a further variation, while controlling the in-home device, the central controller can be configured to send a control command to the in-home device using one of: an infrared signal, a sound signal, and an RF signal.

In a further variation, while controlling the in-home device, the central controller can be configured to send a control command to the in-home device via a network interface, in response to be in-home device being network-enabled.

In a further variation, the network interface can include one of: a Wi-Fi® interface, a cellular interface, a Bluetooth® interface, a Z-Wave® interface, a ZigBee® interface, and an Ethernet interface.

In a variation on this embodiment, the mechanical supporting structure can include a 4-gang box.

One embodiment can provide a home-automation system. The home-automation system can include a wall-mounted controller and one or more home appliances controlled by the wall-mounted controller. The wall-mounted controller can include a central controller, one or more printed circuit boards (PCBs), and a plurality of sensors mounted on the one or more PCBs. The central controller can be configured to detect a user event based on output from multiple sensors, each sensor configured to sense parameters in a different physical domain.

One embodiment can provide a computer-executive method for home-automation. The method can include receiving, at a central controller, sensor data from multiple sensors mounted onto one or more printed circuit boards (PCBs). The central controller and the PCBs are mechanically coupled to a mechanical supporting structure, and each sensor can be configured to sense parameters in a different physical domain. The method can further include detecting a user event based on the received sensor data from the multiple sensors.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the disclosed system is not limited to the embodiments shown, but is to be accorded the widest scope consistent with the principles and features disclosed herein.

Overview

Embodiments of the invention solve at least the technical problem of home automation. More specifically, a compact, centralized home-automation device or system, also referred to as a super sensor, is provided. The home-automation system can include a variety of sensor devices, such as a light-intensity sensor, a temperature-and-humidity sensor, a passive infrared (PIR) sensor, one or more microphones, and a camera. These sensors, when integrated inside a physical enclosure, can allow for simultaneous sensing in multiple physical domains and can allow for more accurate model reconstruction. The system can also include one or more speakers for providing audio output, and one or more IR or RF signal emitters for sending out control signals to other in-home devices or appliances. In order to communicate with other in-home devices or the Internet, the system can also include one or more network interfaces, such as an Ethernet interface, a Wi-Fi® interface, a Bluetooth® interface, a cellular interface, etc. This compact system can conform to a standard form factor and can be mounted in-wall, thus allowing for easy installation.

System Overview

Figure 1:
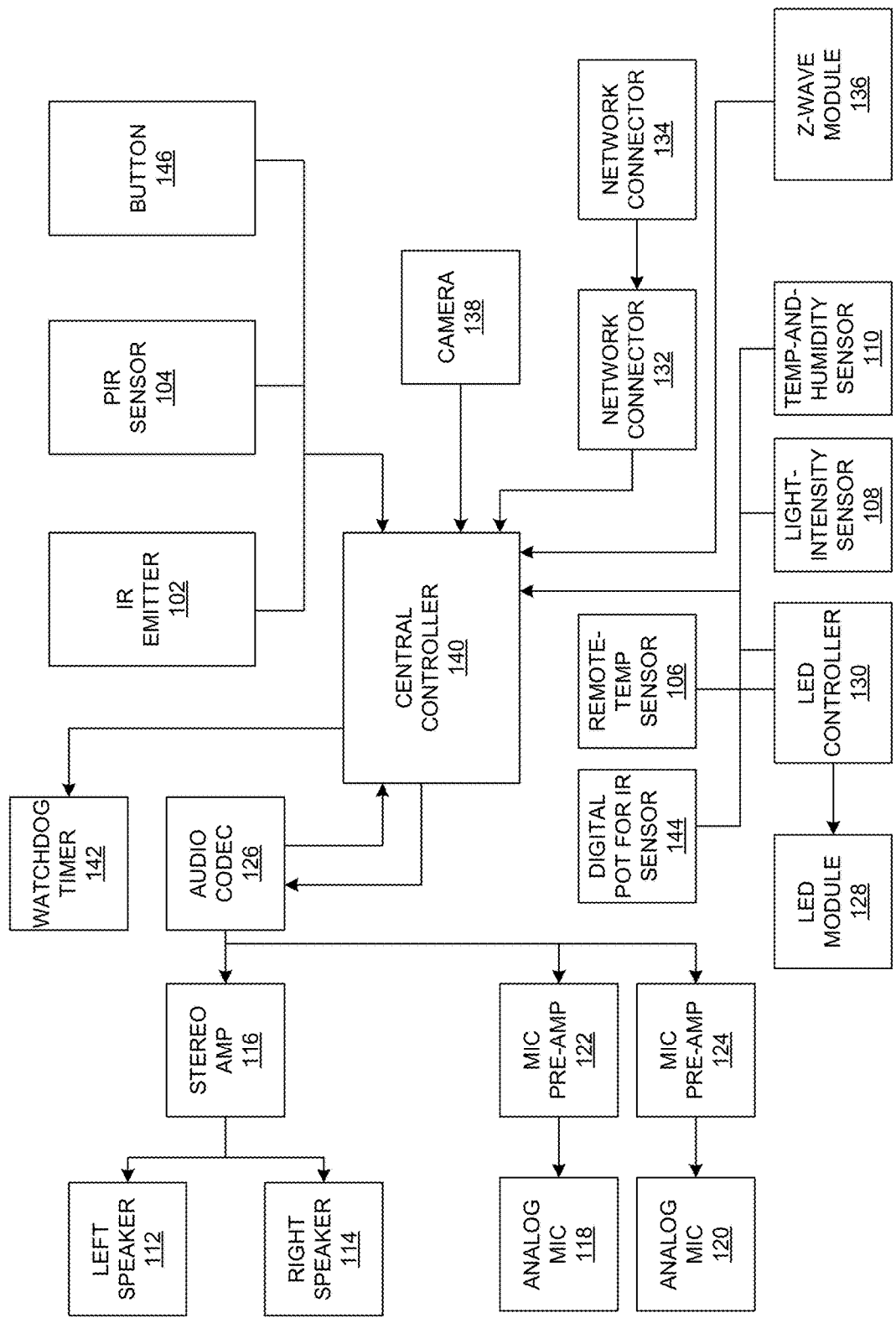
FIG. 1 presents a block diagram illustrating an exemplary architecture of a wall-mounted home-automation device, according to one embodiment.

FIG. 1 presents a block diagram illustrating an exemplary architecture of a wall-mounted home-automation device, according to one embodiment. Wall-mounted home-automation device 100 can include a number of sensors, such as PIR sensor 104, remote-temperature sensor 106, light-intensity sensor 108, and temperature-and-humidity sensor 110. Wall-mounted home-automation device 100 can include one or more IR emitters (e.g., IR emitter 102). Wall-mounted home-automation device 100 can include an audio system that includes a left-speaker module 112, a right-speaker module 114, a stereo-amplifier module 116, analog microphones 118 and 120, microphone pre-amplifiers 122 and 124, and an audio-codec module 126. Wall-mounted home-automation device 100 can include an LED (light-emitting diode) module 128 and an LED controller 130. Wall-mounted home-automation device 100 can include a number of network interfaces, such as network connectors 132 and 134 and Z-Wave® module 136. Wall-mounted home-automation device 100 can include a camera module 138. Wall-mounted home-automation device 100 can also include a central controller 140, a watchdog timer 142, and a digital potentiometer 144. Wall-mounted home-automation device 100 can further include a tactile button 146.

Central controller 140 can be the "brain" of wall-mounted home-automation device 100. More specifically, central controller 140 can receive input from the various sensing devices (e.g., the sensors, the camera, the microphone, etc.) and output commands to the various user interfaces (e.g., the speakers, the LEDs, etc.). Central controller 140 can also receive input from and output commands to other remote home devices or appliances via various network interfaces. In some embodiments, central controller 140 can include a microcontroller or a single-board computer. For example, central controller 140 can be implemented using a Raspberry Pi® (e.g., a Raspberry Pi Zero or a Raspberry Pi 3 Model B) computer.

The variety of sensors can be implemented using various integrated circuit (IC) chips that can interface with central controller 140 using various digital interfaces. Examples of digital interfaces can include inter-integrated circuit (I²C), inter-IC sound (I²S), and general-purpose input/output (GPIO). For example, digital potentiometer 144, remote temperature sensor 106, light-intensity sensor 108, and temperature-and-humidity sensor 110 can include different types of IC chips coupled to central controller 140 using I²C buses. On the other hand, PIR sensor 104 and tactile button 146 can interface with central controller 140 via GPIO interfaces.

Note that digital potentiometer 144 can be paired with PIR sensor 104 to provide motion detection with tunable (or programmable) sensitivity. In some embodiments, an off-the-shelf PIR sensor can be modified by replacing its manual sensitivity adjustment module (typically a potentiometer) with GPIO pins coupled to central controller 140, thus providing automated sensitivity adjustment.

Tactile button 146 can include a tactile switch that allows the user to turn on and off wall-mounted home-automation device 100. In some embodiments, tactile button 146 can also include an embedded LED for illumination.

IR emitter 102 allows wall-mounted home-automation device 100 to control other in-home devices via IR signals. For example, IR pulses can be emitted by IR emitter 102 and received by an IR-signal receiver on an in-home device (e.g., a TV). By controlling the emission of IR pulses, central controller 140 can control such an in-home device (e.g., turning on or off the TV or changing channels). More specifically, IR emitter 102 can emit IR light at a wide angle, thus being capable of reaching in-home devices over a wide range. In some embodiments, central controller 140 can control the pulse width of the IR pulses in order to adjust their brightness. Such control can be done directly over the GPIO interface at a low frequency. For example, a modulated current or voltage can be sent to IR emitter 102 via the GPIO pins that couple IR emitter 102 and central controller 140. In some embodiments, wall-mounted home-automation device 100 can include multiple (e.g., two or three) IR emitters, emitting IR lights at the same or different wavelengths. Using IR signals to control in-home devices can eliminate the need to pre-wire certain in-home devices. In some embodiments, in addition to IR emitters, wall-mounted home-automation device 100 can also include one or more RF transmitters (not shown in FIG. 1) for controlling in-home devices using RF signals.

The audio system can also include compact speakers and microphones. In some embodiments, left and right speaker modules 112 and 114 can include 2.5-inch, 4 ohm, full-range speakers. In other words, the diameter of the cone of the speaker can be roughly 2.5 inches or 6.35 centimeters. The microphones can be much smaller. In some embodiments, the diameter of microphones 118 and 120 can be roughly 1 centimeter, and microphones 118 and 120 can be placed roughly 1.2 inches apart. Stereo-amplifier module 116 can be a dual-channel class-D power amplifier. In some embodiments, stereo-amplifier module 116 can provide at least 15 W to each channel. Audio-codec module 126 can be a low-power audio-codec module designed for portable audio products. Audio-codec module 126 can provide left and right channel line input for receiving input signals from microphones 118 and 120. Analog-to-digital converter (ADC) modules included within audio-codec module 126 can convert the analog audio signals to digital signals. Audio-codec module 126 can also include digital-to-analog converter (DAC) modules that can convert the digital audio signals received from central controller 140 to analog audio signals before sending them to stereo-amplifier module 116. Audio-codec module 126 can couple to central controller 140 via an I$^2$S interface.

LED module 128 can include multiple red-green-blue (RGB) LEDs that can be used to indicate statuses of the various sensors. In some embodiments, LED module 128 can include at least five RGB LEDs, all of which can be controlled by LED controller 130. In some embodiments, LED controller 130 can control the brightness and/or color of the LEDs using pulse width modulation (PWM). More specifically, LED controller 130 can control currents sent to the LEDs within LED module 128. In some embodiments, light pipes (either rigid or flexible) can be used to guide lights to the surface plate of wall-mounted home-automation device 100. LED controller 130 can interface with central controller 140 via an I$^2$C bus.

Camera module 138 can include a compact digital camera capable of taking still pictures as well as videos. In some embodiments, camera module 138 can include a low-voltage high-performance CMOS image sensor. In some embodiments, camera module 138 can include a MIPI interface for coupling with central controller 140. For example, central controller 140 can include a MIPI port, and camera module 138 can be plugged into the MIPI port. The software driver of camera module 138 can be pre-installed on central controller 140.

Watchdog timer 142 can be coupled to central controller 140 via a GPIO interface. More specifically, central controller 140 can send, via the GPIO interface, a single digital pulse to reset watchdog timer 142. In some embodiments, watchdog timer 142 can have ultralow power consumption with an $I_{cc}$ of less than 100 nA. In some embodiments, the timeout period of watchdog timer 142 can be between 20 seconds and one minute.

In some embodiments, network connectors 132 and 134 can include Ethernet connectors, such as RJ45 connectors, thus allowing wall-mounted home-automation device 100 to communicate with other in-home devices or remote sensors. On the other hand, Z-Wave module 136 can enable wall-mounted home-automation device 100 to communicate with certain in-home devices using Z-Wave. In some embodiments, Z-Wave module 136 can couple to central controller 140 via a USB (universal serial bus) interface. Although not shown in FIG. 1, wall-mounted home-automation device 100 can communicate with other devices and access the Internet using other types of network interfaces, including but not limited to: Wi-Fi, cellular, Bluetooth, ZigBee®, land-line telephone, etc.

System Assembly

Figure 2:
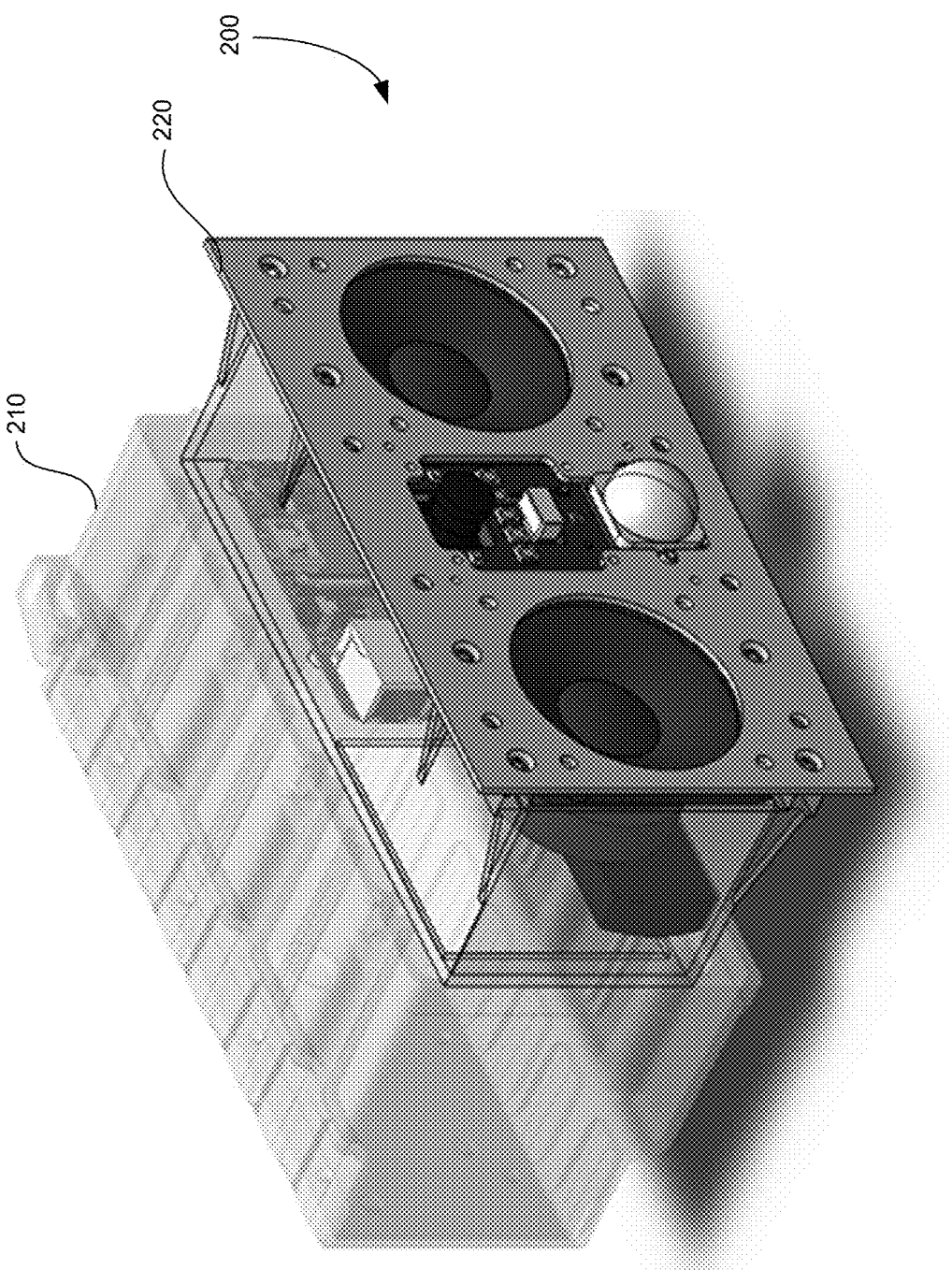
FIG. 2 presents a diagram illustrating an exemplary view of a packaged wall-mounted home-automation device, according to one embodiment.

FIG. 2 presents a diagram illustrating an exemplary view of a packaged wall-mounted home-automation device, according to one embodiment. In FIG. 2, wall-mounted home-automation device 200 can include a mechanical supporting structure, which includes a wall box 210 and a front cover 220. When assembled, wall box 210 and front cover 220 can form a physical enclosure that houses the various components (e.g., central controller, audio system, sensors, etc.) shown in FIG. 1. For simplicity of illustration, details of these various components are not shown in FIG. 2.

To ensure the packaged wall-mounted home-automation device is compact and can be easily installed on the interior wall of a room (e.g., a room within a single-family house or a room within an apartment unit), in some embodiments, wall box 210 can comply with a certain standard form factor. In one embodiment, wall box 210 can include a standard gang box (e.g., a 4-gang box), which can be made of plastic, steel, or other types of suitable material. The standard form factor allows the easy installation of the wall-mounted home-automation device in existing homes and makes it possible for future home builders to incorporate the wall-mounted home-automation device in their building plan.

Figure 3A:
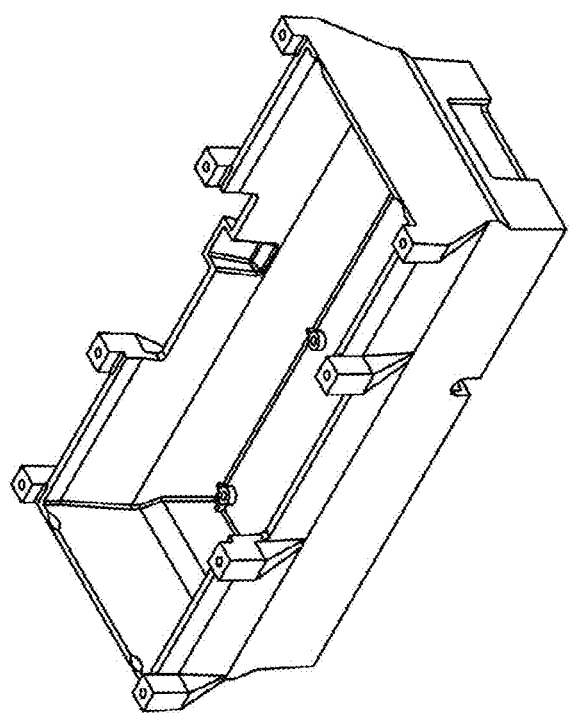
FIG. 3A shows an isometric view of an exemplary wall box, according to one embodiment.
Figure 3C:
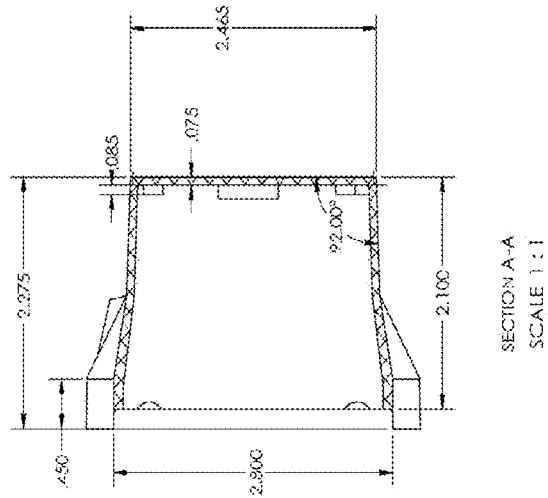
FIG. 3C shows a cross-sectional view of the exemplary wall box, according to one embodiment.
Figure 3B:
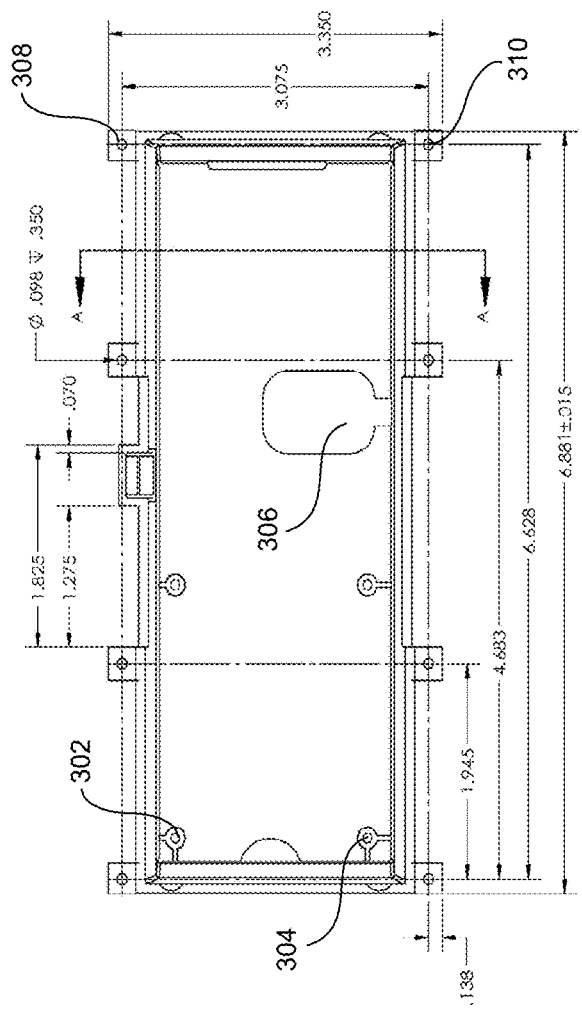
FIG. 3B shows a top view of the exemplary wall box, according to one embodiment.

FIG. 3A shows an isometric view of an exemplary wall box, according to one embodiment. Wall box 300 can be roughly shaped like a rectangular prism. FIG. 3B shows a top view of the exemplary wall box, according to one embodiment. FIG. 3C shows a cross-sectional view of the exemplary wall box, according to one embodiment. In both drawings, the dimensions are in inches. Note that these dimensions are for exemplary purposes only and do not limit the scope of the current invention.

FIGS. 3B and 3C can show that the wall box can include, at its bottom surface, a number of mounting holes (which can be threaded holes), such as mounting holes 302 and 304. These mounting holes can facilitate the installation of the central controller. The wall box can also include an opening 306 in its back wall. Such an opening allows for power and/or networking cables (e.g., a power-over-Ethernet cable) to gain access to the interior of the wall box. A number of mounting holes (e.g., mounting holes 308 and 310) can be on the rim of the wall box, facilitating the attachment of a cover and installation of the wall box to the wall. Note that the wall box can be installed onto the wall in various ways, such as recessed mounting (the outer rims of the wall box are recessed from the wall surface), flush mounting (the outer rims of the wall box are lined up with the wall surface), and extruded mounting (the outer rims of the wall box extrude from the wall surface).

Figure 4A:
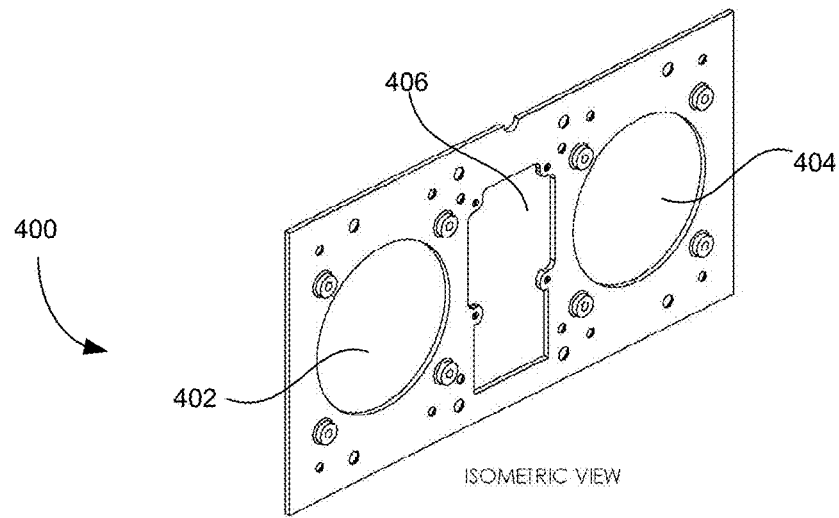
FIG. 4A shows an isometric view of an exemplary cover, according to one embodiment.
Figure 4B:
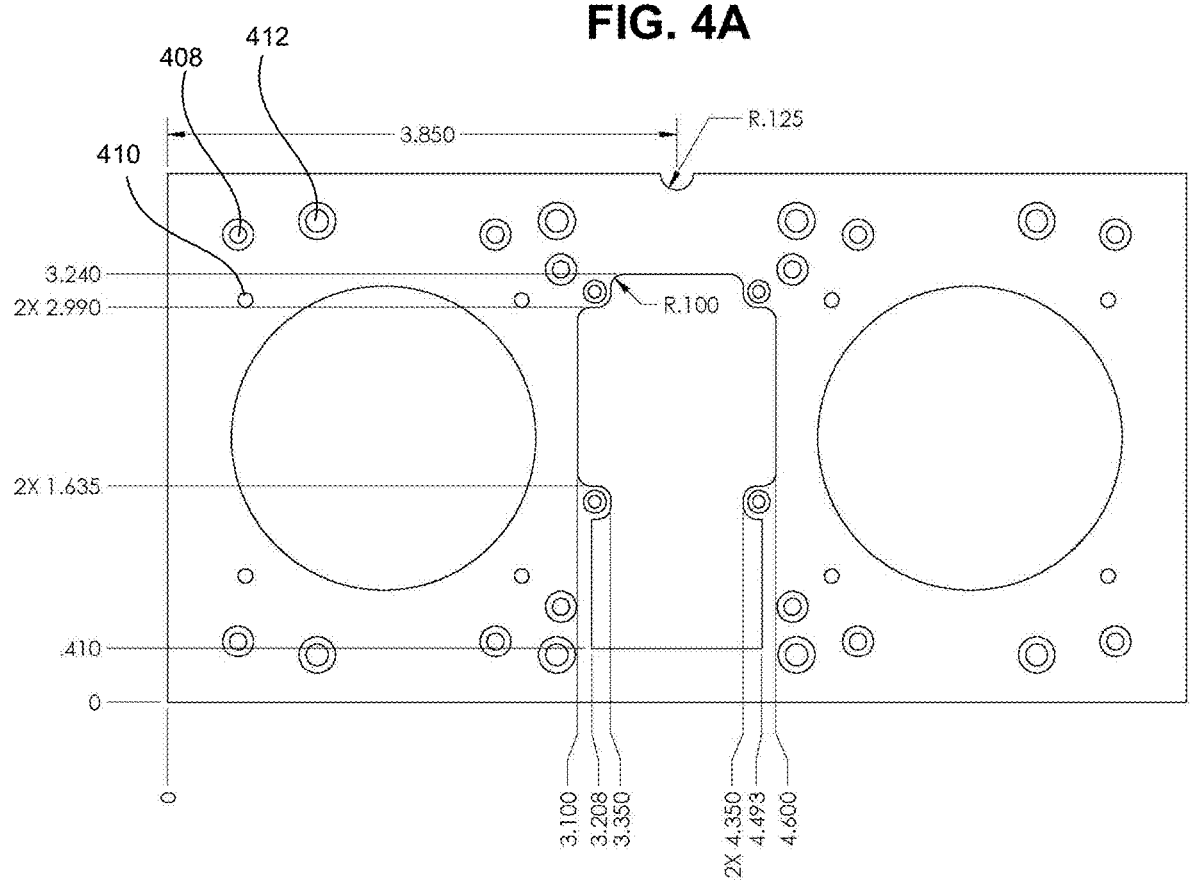
FIG. 4B shows a bottom view of the exemplary cover, according to one embodiment.

FIG. 4A shows an isometric view of an exemplary cover, according to one embodiment. FIG. 4B shows the bottom view of the exemplary cover, according to one embodiment. In FIG. 4B, the dimensions are in inches and are exemplary only. As shown in FIGS. 4A and 4B, cover 400 can include a number of openings for exposure of various components. For example, circular openings 402 and 404 can be used for the speakers, and center opening 406 can be used for other components, such as the camera, the PIR sensor, the LEDs, etc. The mounting holes of various sizes (e.g., mounting holes 408, 410, and 412) can be used for mounting various components on cover 400 and mounting cover 400 to the wall box.

In some embodiments, many components of the wall-mounted home-automation device can be installed onto one or more printed circuit boards (PCBs). In further embodiments, the wall-mounted home-automation device can include a larger main PCB and a smaller daughter (or mezzanine) PCB. The main PCB can be placed closer to the back surface of the wall box and the daughter PCB can be mounted onto the main PCB, thus allowing various sensor components mounted on the daughter PCB to be closer to the front surface of the wall box.

Figure 5:
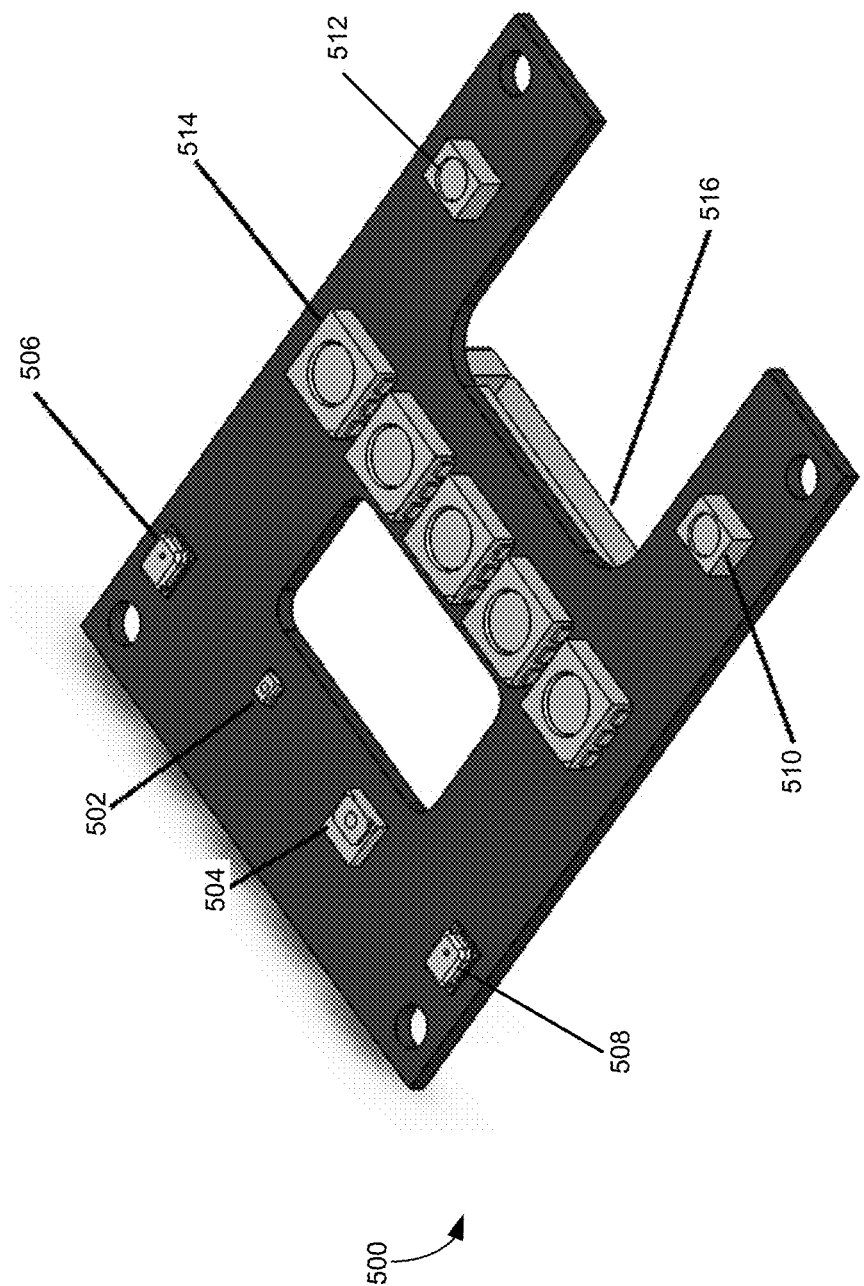
FIG. 5 shows an exemplary daughter printed circuit board (PCB), according to one embodiment.

FIG. 5 shows an exemplary daughter printed circuit board (PCB), according to one embodiment. Daughter board 500 can include a number of devices mounted on its front surface, including ambient light sensor 502, temperature-and-humidity sensor 504, microphones 506 and 508, IR emitters 510 and 512, and a number of LEDs (e.g., LED 514). Daughter board 500 can also include, on its back surface, connector 516 for coupling to the main PCB.

Figure 6A:
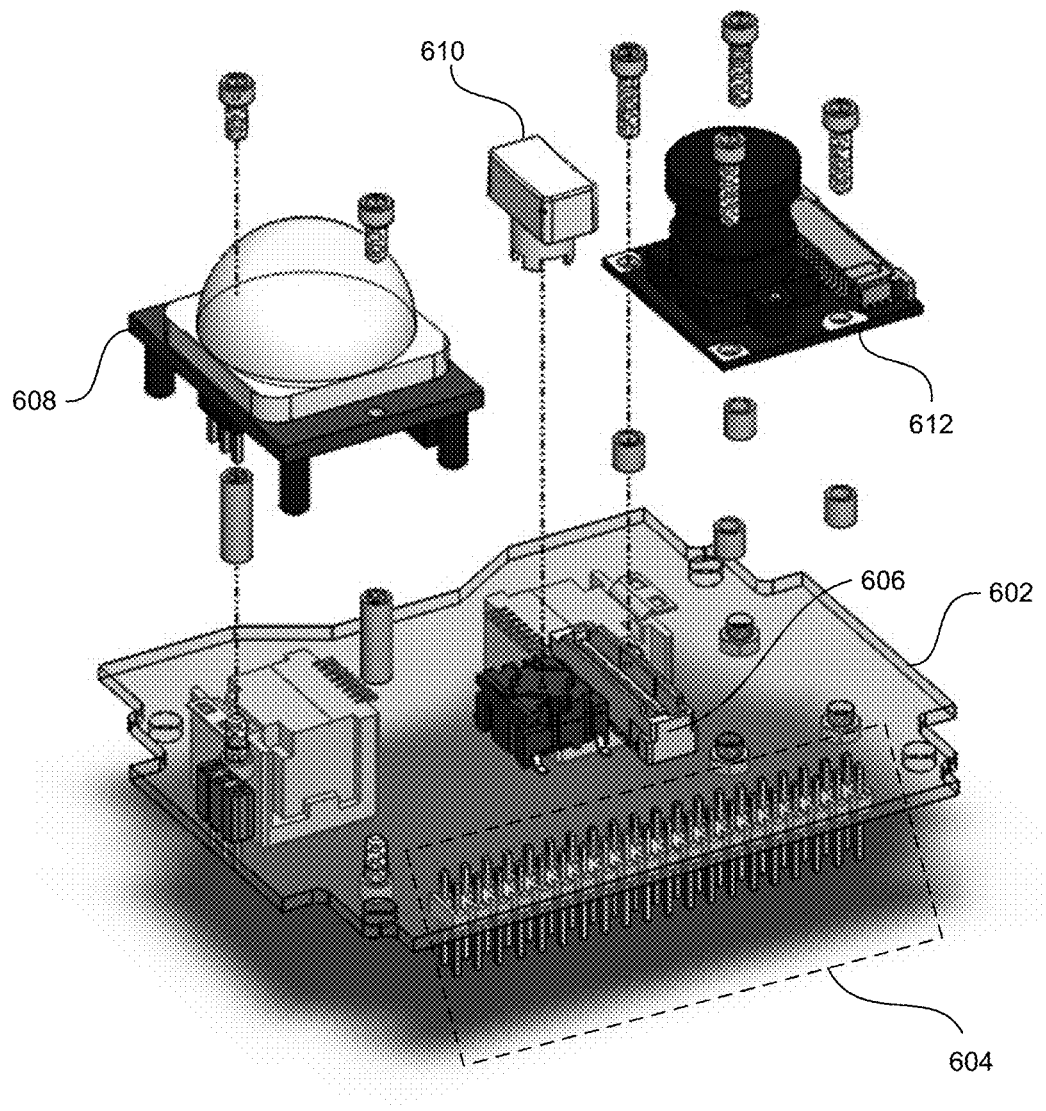
FIG. 6A shows an exploded view of an exemplary main PCB, according to one embodiment.

FIG. 6A shows an exploded view of an exemplary main PCB, according to one embodiment. Main PCB 600 can include substrate 602 and a number of connectors mounted onto substrate 602, including GPIO header 604 and mezzanine PCB connector 606. GPIO header 604 can include a plurality of GPIO pins, and mezzanine PCB connector 606 can couple main PCB 600 and a daughter PCB (not shown in FIG. 6A) positioned above main PCB 600. A number of sensing devices can be mounted onto main PCB 600, including PR sensor 608, tactile button 610, and camera 612. The sensing devices mounted onto main PCB 600 are often larger than the ones mounted onto the daughter PCB. Various screws and standoffs can be used to facilitate mounting the sensing devices.

Figure 6B:
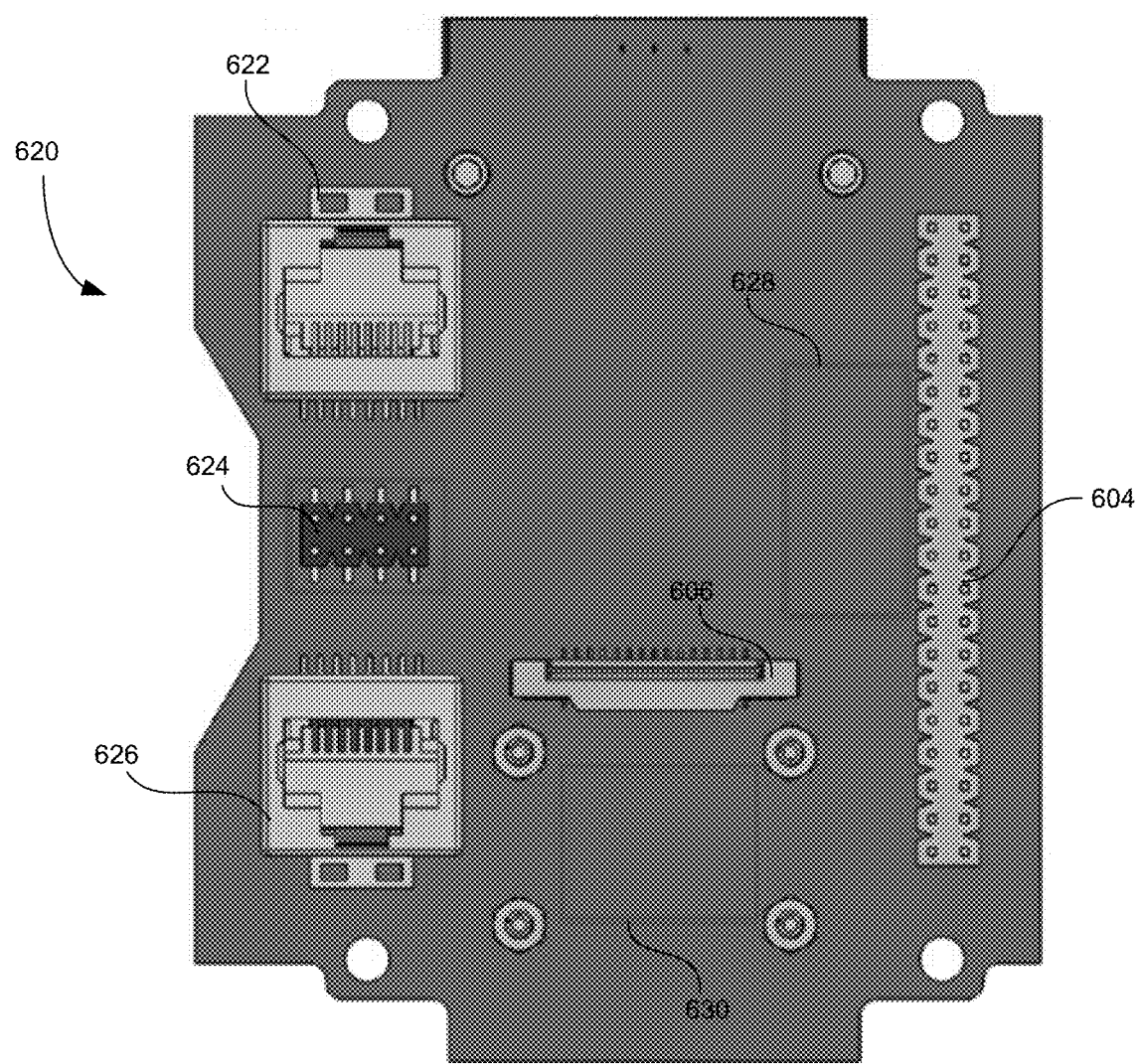
FIG. 6B shows the back surface of the exemplary main PCB, according to one embodiment.

FIG. 6B shows the back surface of the exemplary main PCB, according to one embodiment. A number of connectors can be mounted on the back surface 620 of the main PCB, including POE connector 622 for receiving POE input, I$^2$C breakout 624, and Ethernet output connector 626. One can also view GPIO header 604 and mezzanine PCB connector 606 from back surface 620 of the main PCB. Additional connectors can also be placed in the empty spaces marked by rectangles 628 and 630.

Figure 7A:
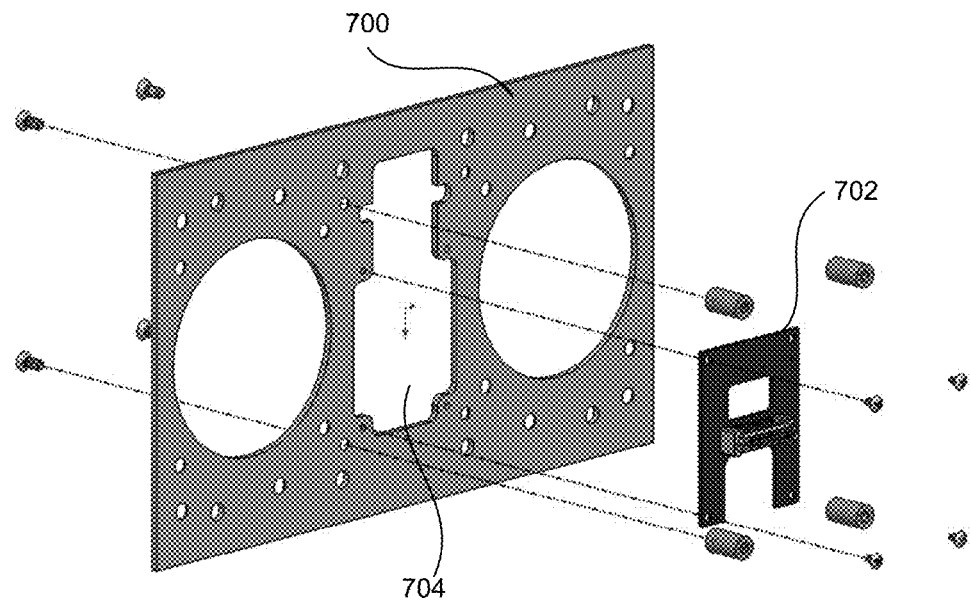
FIGS. 7A-7C illustrate the process for assembling a speaker panel, according to one embodiment.
Figure 7B:
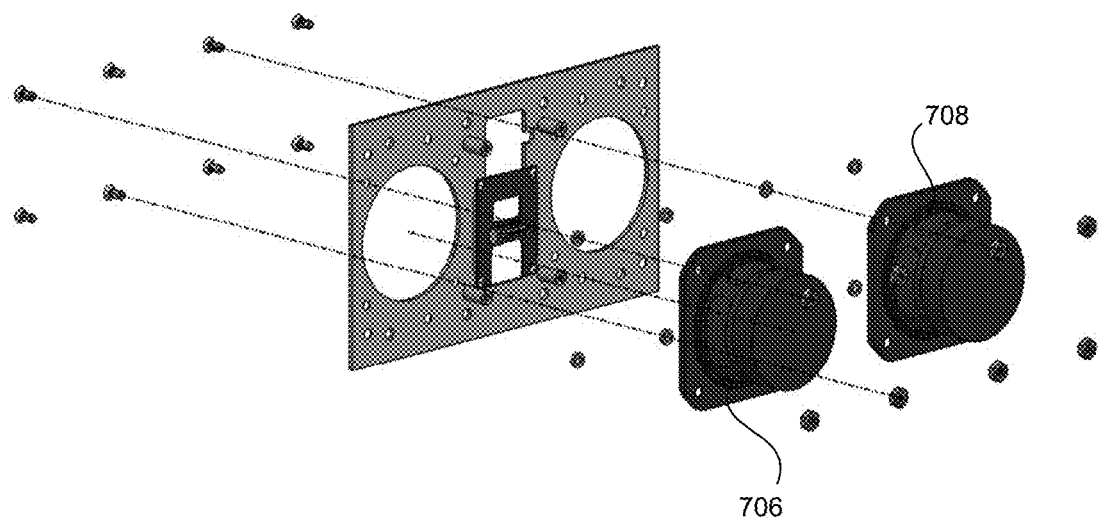
Figure 7C:
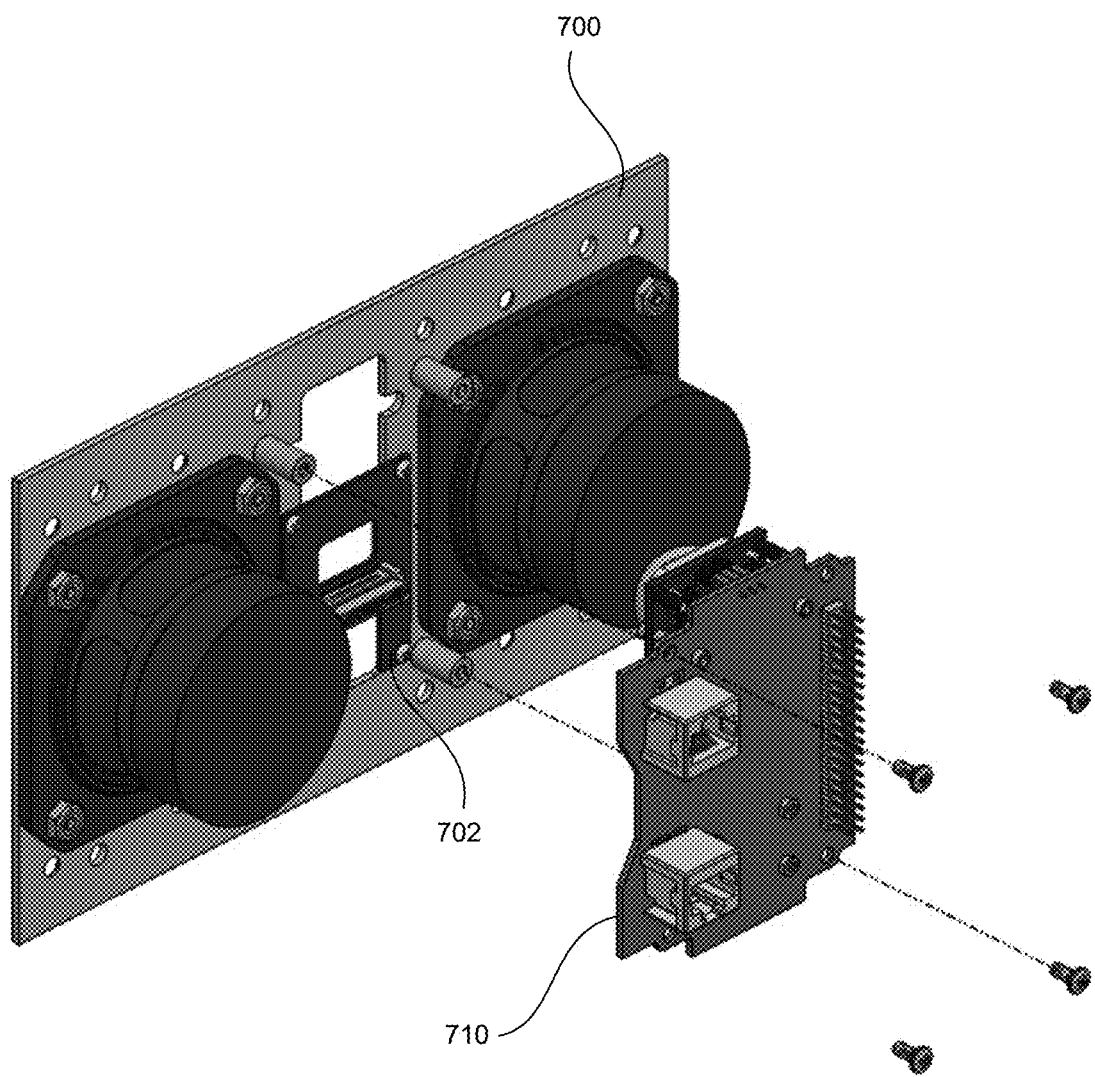

FIGS. 7A-7C illustrate the process for assembling a speaker panel, according to one embodiment. More specifically, FIG. 7A shows the mounting of daughter PCB 702 onto the back surface of cover 700. A number of standoffs and screws can be used to facilitate the mounting of daughter PCB 702. More specifically, daughter PCB 702 can be mounted in such a way that the various sensors on daughter PCB 702 can be exposed via center opening 704 on cover 700.

FIG. 7B shows the mounting of speakers 706 and 708 onto the back surface of cover 700. FIG. 7C shows that, subsequent to mounting the daughter PCB and speakers, one can mount main PCB 710 on cover 700, over daughter PCB 702, completing the speaker panel assembly. The mezzanine PCB connectors on daughter PCB 702 and main PCB 710 can be mated.

Figure 8:
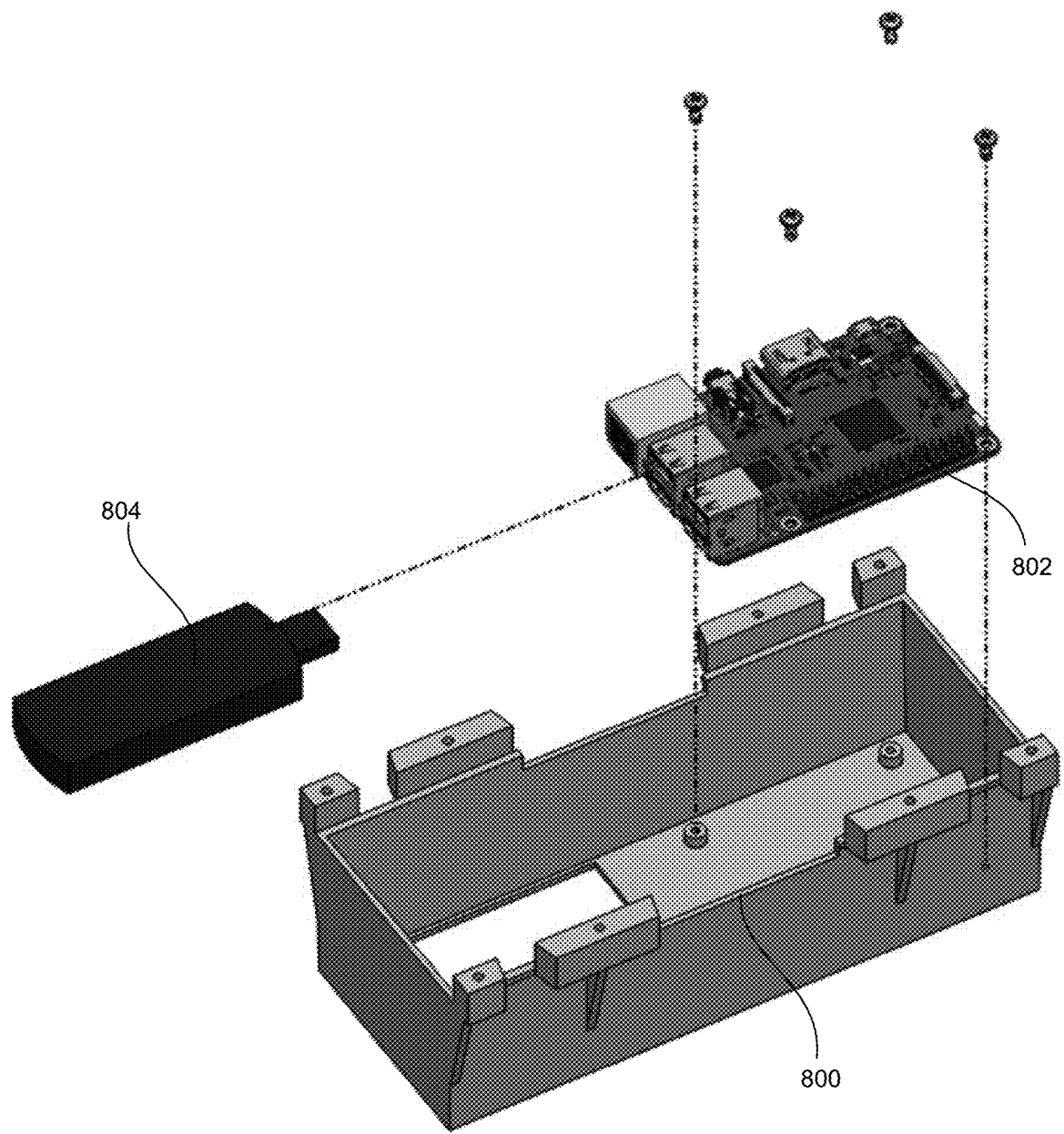
FIG. 8 illustrates the mounting of the central controller into the wall box, according to one embodiment.

FIG. 8 illustrates the mounting of the central controller into the wall box, according to one embodiment. More specifically, central controller 802 can be mounted to the back surface of wall box 800 via a number of mounting holes. In some embodiments, central controller 802 can be a Raspberry Pi computer and can include a number of interfaces, such as USB, GPIO, MIPI, I$^2$S, I$^2$C, etc. Prior to mounting, a network adaptor (e.g., a Z-Wave adaptor) 804 can be inserted into a USB port on central controller 802.

Figure 9A:
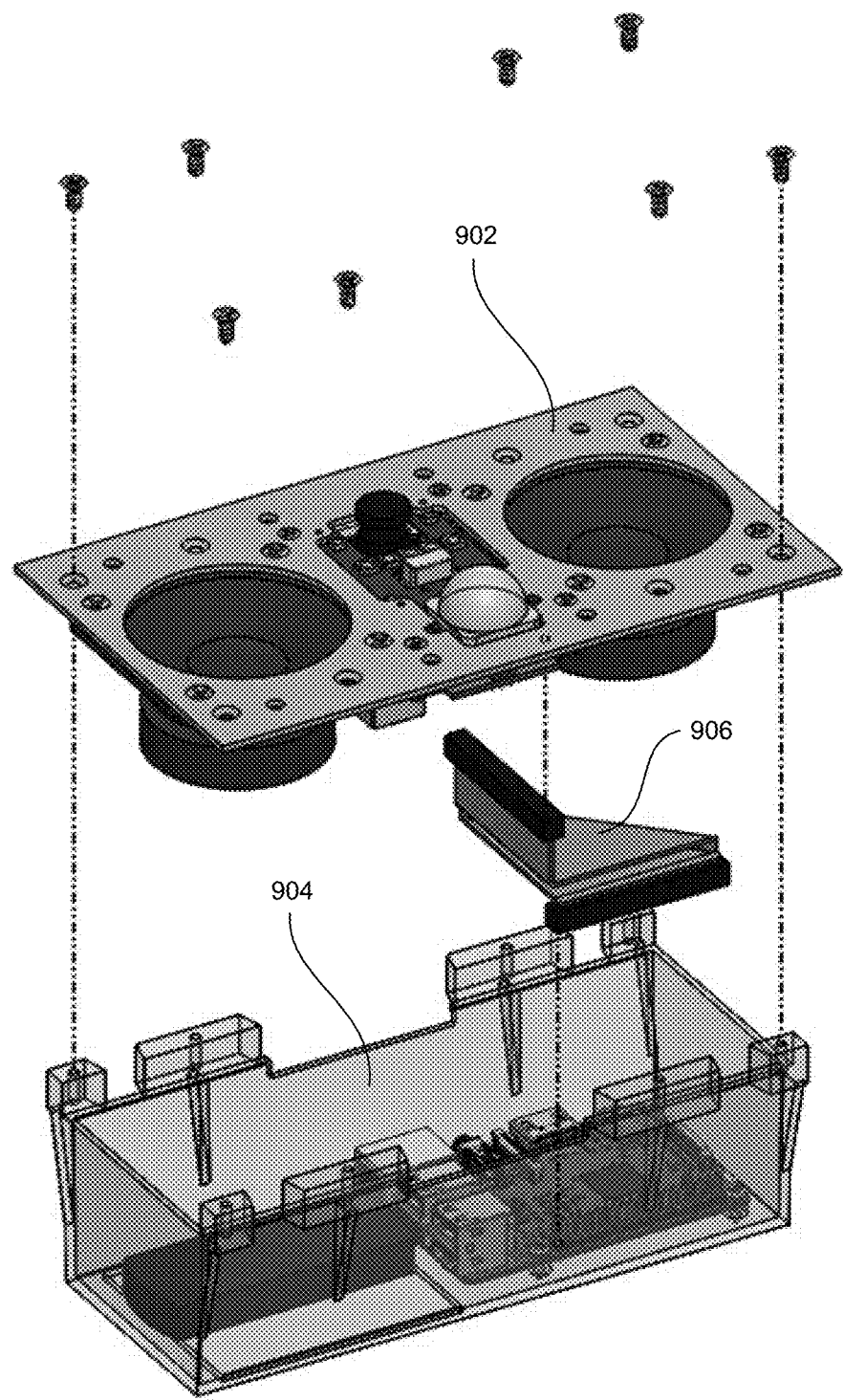
FIG. 9A illustrates assembling the speaker panel assembly and the wall box, according to one embodiment.
Figure 9B:
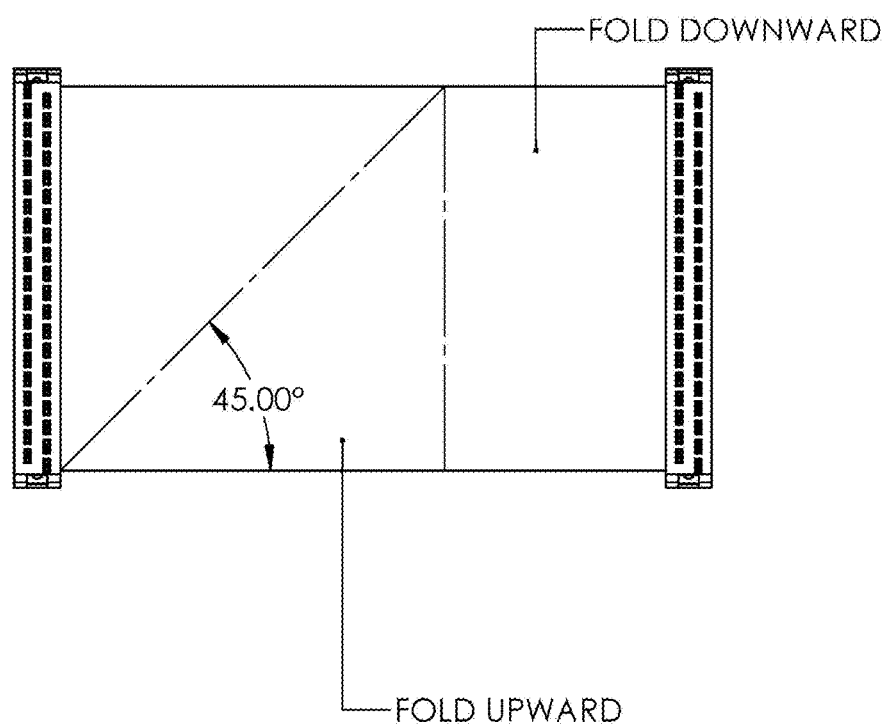
FIG. 9B shows how to fold a ribbon cable, according to one embodiment.

FIG. 9A illustrates assembling the speaker panel assembly and the wall box, according to one embodiment. As discussed previously, speaker panel assembly 902 can include a main PCB, a daughter PCB, and speakers, all mounted on a front cover, and wall box 904 can include the mounted central controller module and network adaptor. To enable a compact package, the GPIO header on the main PCB and the GPIO header on the central controller are oriented perpendicular to each other, and pre-folded ribbon cable 906 can couple these two GPIO headers. This compact package allows for easy installation. FIG. 9B shows how to fold a ribbon cable, according to one embodiment. As demonstrated in FIG. 9B, after folding, the two connectors of the ribbon cable will be oriented perpendicular to each other. In addition to pre-folded ribbon cable 906, a network cable (e.g., an Ethernet cable) may also be used to couple a network port on the main PCB with a network port on the central controller.

Figure 10A:
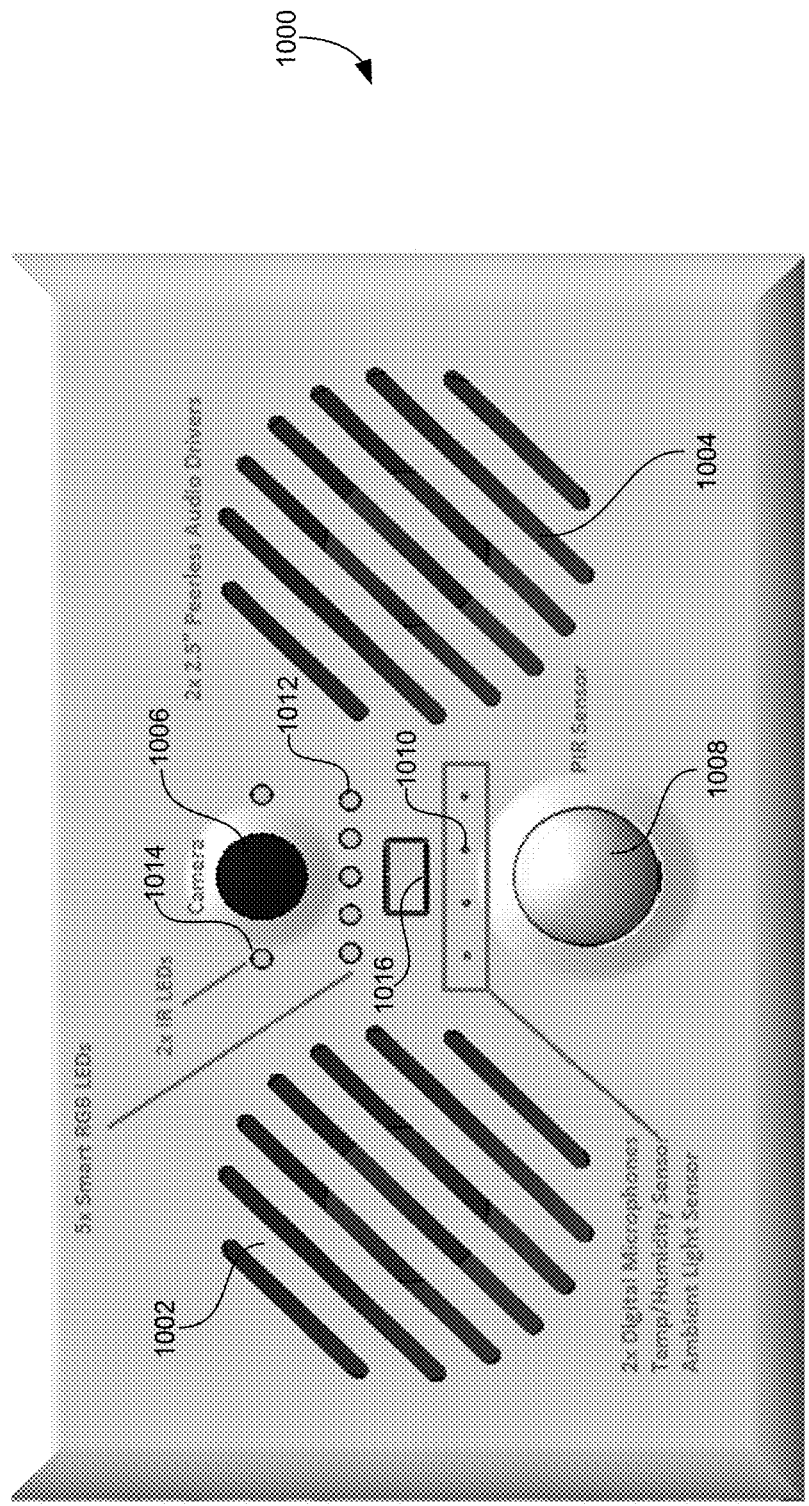
FIG. 10A shows a decorative front panel for the wall-mounted home-automation device, according to one embodiment.
Figure 10B:
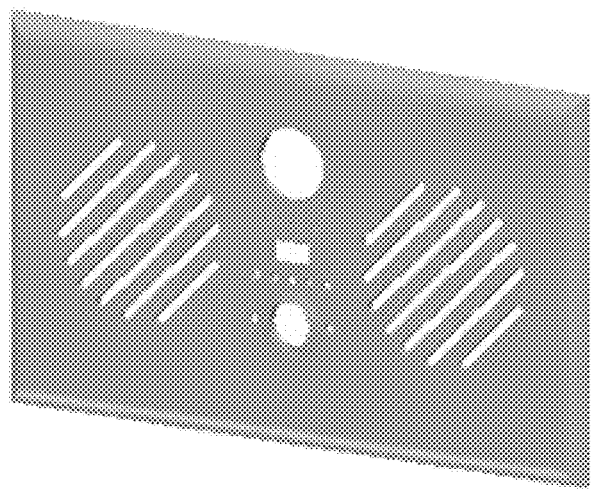
FIG. 10B shows a perspective view of the decorative front panel, according to one embodiment.

FIG. 10A shows a decorative front panel for the wall-mounted home-automation device, according to one embodiment. Front panel 1000 can include grills 1002 and 1004 for the speakers, and openings 1006 and 1008 for the camera and PIR sensor, respectively. Front panel 1000 can also include a number of smaller openings (e.g., opening 1010) for accommodating the microphones, temperature-and-humidity sensor, and light sensor, together with a number of LED openings (e.g., opening 1012) for the RGB LEDs. Note that the RGB LEDs can be used to indicate the operational status of the wall-mounted home-automation device. Front panel 1000 can also include openings (e.g., opening 1014) for the IR emitters and opening 1016 for the tactile button. FIG. 10B shows a perspective view of the decorative front panel, according to one embodiment. Note that the decorative panel shown in FIGS. 10A-10B is for exemplary purposes only; the shapes, sizes, and locations of the various openings can vary depending on the shapes, sizes, and locations of the various sensors.

Figure 10C:
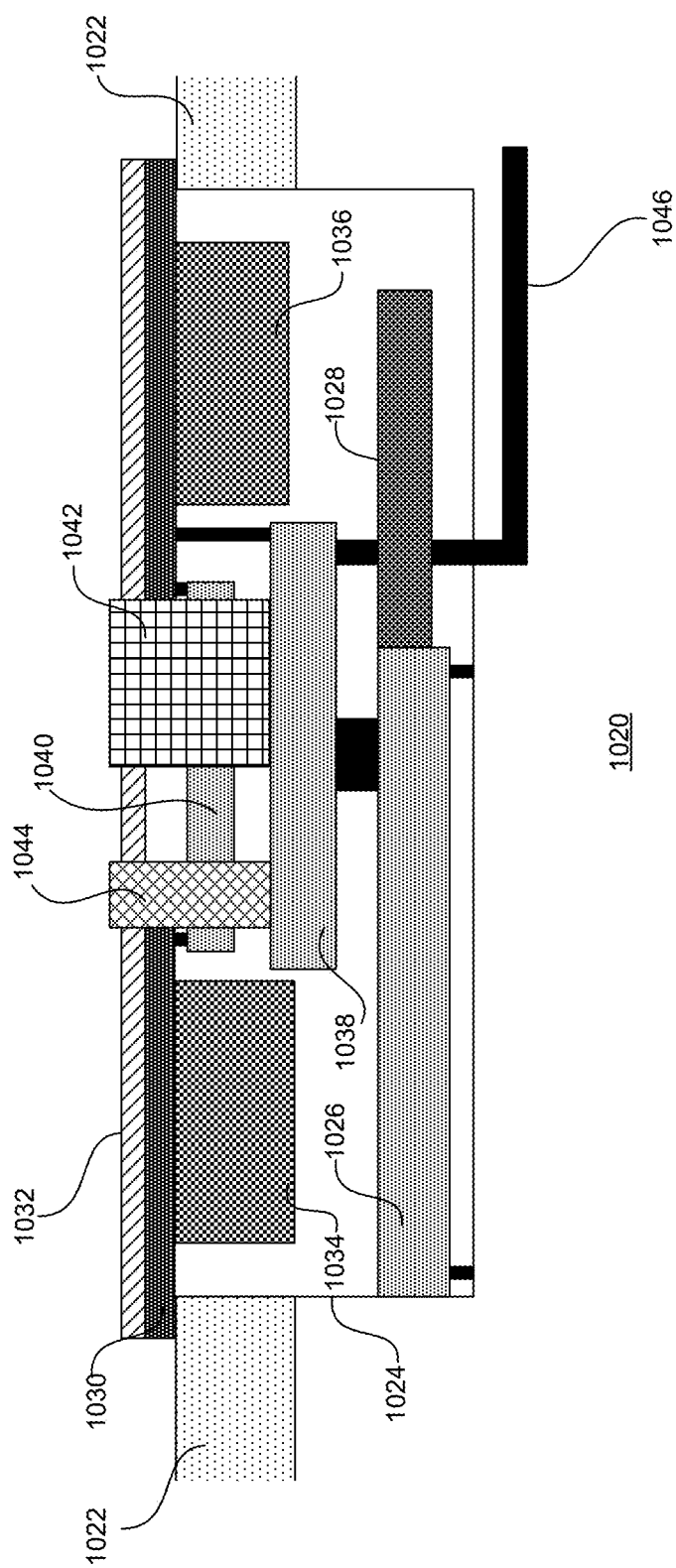
FIG. 10C shows a simplified cross-sectional view of the wall-mounted home-automation device, according to one embodiment.

FIG. 10C shows a simplified cross-sectional view of the wall-mounted home-automation device, according to one embodiment. In FIG. 10C, wall-mounted home-automation device 1020 can be mounted onto wall 1022. In this example, wall-mounted home-automation device 1020 is mounted onto wall 1022 in such a way that wall box 1024 is flush mounted onto wall 1022, meaning that the front surface of wall box 1024 can be perfectly aligned to the front surface of wall 1022. Note that other types of mounting, such as recessed or extruded mounting, can also be possible.

Central controller 1026 (e.g., a Raspberry Pi computer) can be mounted onto the back surface of wall box 1024, and a network module 1028 (e.g., a Z-Wave USB adaptor) can be inserted into a corresponding port (e.g., a USB port) on central controller 1026.

A cover 1030 can be placed on the front surface of wall box 1024 and a decorative front panel 1032 can be placed on top of cover 1030. In the example shown in FIG. 10C, cover 1030 can be mounted onto wall 1022. In the event that wall box 1024 is mounted in an extruded way, cover 1030 may be mounted directly onto the front surface of wall box 1024. Various components, such as speakers 1034 and 1036, main PCB 1038, and daughter PCB 1040 can be mounted onto the back surface of cover 1030. Moreover, camera 1042 and PIR sensor 1044 can be mounted onto main PCB 1038, with their front surfaces exposed to the outside environment via openings on cover 1030 and decorative front panel 1032. Note that, for simplicity of illustration, many components, such as sensors or connectors, are not shown in FIG. 10C.

FIG. 10C also shows a power and/or network cable 1046 that can access wall box 1024 via an opening on the back surface of wall box 1024. In some embodiments, cable 1046 can couple to main PCB 1038, thus providing power and/or network connections to components on main PCB 1038. Moreover, main PCB 1038 can include a number of step-down power converters that can convert the received POE DC input (e.g., 48 V) to lower voltages, such as 12 V, 5 V, and 3.3 V, thus being capable of providing power to a wide array of components. Other than POE, in some embodiments, a conventional alternating current (AC) or direct current (DC) power supply can also be used to supply power to the wall-mounted home-automation device.

Home-Automation Applications

As discussed previously, the wall-mounted home-automation device can include a plurality of sensors, making it possible to sense the home environment in multiple physical domains, including but not limited to: visible spectrum, infrared spectrum, sound, light, temperature, humidity, etc., simultaneously. The simultaneous, multi-domain sensing can lead to a more accurate model reconstruction.

More specifically, the wall-mounted home-automation device can be installed on the interior wall of a room at a predetermined location, thus being capable of sensing the various environmental factors with a degree of spatial accuracy. For example, because the height of the wall-mounted home-automation device is known, when the PIR sensor detects motion, the central controller of the wall-mounted home-automation device can calculate, based on the detection result and the height of the PIR sensor, the height of the moving person. This information makes it possible for the system to infer the identity of the person, given that the system has prior knowledge of the heights of the occupants in the residence. Or the system may determine that the motion is due to a family pet. Similarly, because the wall-mounted home-automation device is located at a known-calibrated location, when the PR sensor detects motion, the wall-mounted home-automation device can use the detected distance and direction to infer the location of the person (e.g., in the kitchen or in bed) given that the system has prior knowledge of the layout of the building.

Second, because the various sensors are placed in the same physical enclosure, close to each other, more accurate timestamping can be provided. This can allow for more accurate model reconstruction. In some embodiments, the system can implement a machine-learning model that can be trained to recognize voices and gestures from users, thus enabling personalized user interactions. For example, the central controller can include a voice-recognition module that can be trained to recognize users' voice commands. The user can verbally instruct the wall-mounted home-automation device to control various in-home devices, such as turning on and off the TV or air conditioning (AC), changing TV channels, adjusting the temperature settings of the AC thermostat, opening or closing the blinds/curtains, etc. Moreover, the central controller can also include a gesture-recognition module, which can take as input motion-detection results from the PIR sensor. After training, the gesture-recognition module can detect and recognize a user's gesture, such as the user's hand pointing to a particular appliance.

The multiple sensing devices, including the ambient light sensor, the microphones, the PIR sensor, the temperature-and-humidity sensor, the camera, etc., can enable the wall-mounted home-automation device to have an enhanced ability to sense its surrounding home environment. In some embodiments, the wall-mounted home-automation device may perform context (including environmental factors and user activities) analysis based on output from multiple sensors. For example, the ambient light sensor can provide an output indicating the intensity and spectrum of lighting within the room, and the microphone can detect ambient noise level and spectrum. By implementing a machine-learning technique, a light-and-sound-analysis module can be trained to detect a number of environmental factors and user activities, such as watching TV, hosting a party, taking a shower, etc. In some embodiments, the wall-mounted home-automation device can control other in-home devices based on the detected environmental factors and user activities. For example, if the wall-mounted home-automation device detects that the user is watching TV, the wall-mounted home-automation device may reduce the volume or turn off its own speakers. If the wall-mounted home-automation device detects that the user is taking a shower, the wall-mounted home-automation device may send a control signal (e.g., via its IR emitters) to the AC thermostat to raise the temperature setting by one or two degrees. Moreover, if the wall-mounted home-automation device detects that the user is hosting a party, the wall-mounted home-automation device may control the lighting of the room based on the background music.

In addition to light and sound, the wall-mounted home-automation device can detect a number of user events based on output from other sensors. For example, the camera can be used to take still pictures or live videos, and a face detection-and-recognition module can detect and recognize human faces included in the pictures or video frames. The system may further include an emotion-detection module, which can detect the user's emotional state (e.g., happy, sad, annoyed, etc.) based on his facial expression. In some embodiments, the emotion-detection module can also take as input the user's voice in order to detect the user's emotional state. The face-recognition and emotion-detection operations can both involve a machine-learning process. More specifically, they can be trained offline before the wall-mounted home-automation device is installed in the home. Alternatively, the face-recognition and emotion-detection modules can be trained online after the installation of the wall-mounted home-automation device. The face-recognition module allows the wall-mounted home-automation device to detect the identity of a user based on his face. In addition to the user's face, the user's voice can also be used for user identification. For example, the wall-mounted home-automation device collects a user's voice sample (e.g., via the microphones), extracts the user's voice fingerprint, and subsequently detects the presence of a particular user based on the voice fingerprint. Note that, by combining the output of the camera and microphones, the wall-mounted home-automation device can detect the presence of the user at the room level or at the house level. A finer scale detection of the user presence can also be possible if the output of the PIR sensor is also included. Similarly, the presence and activity of a family pet (e.g., a cat or dog) can also be detected based on output from the camera, the sound sensor, and the PIR sensor.

Other user activities or events that can be detected by the wall-mounted home-automation device can include but are not limited to: taking a shower, using the bathtub, using the toilet, getting up from bed, sleeping, drinking or eating, sitting down at the dining table, walking out and closing the door, opening the door and walking in, using the cabinet, using the refrigerator, using the microwave, using the oven, using the sink, making coffee, taking medicines, loading/unloading laundry, adjusting lighting, sitting down on a sofa, sitting down at the desk, watering the plant, cleaning the floor, etc. Many of these user events can be detected by a single sensor or a combination of sensors. As discussed previously, a machine-learning technique can be used to detect user activities. For example, opening and closing the room door often generates noise, and the wall-mounted home-automation device can be trained to detect such a sound in order to detect the door opening/closing activity. During the training period, after recording the sound of the door opening or closing, the wall-mounted home-automation device may obtain user input regarding the cause of the sound.

In addition to detecting user events based on sensor output, in some embodiments, the wall-mounted home-automation device can also detect/sense user events by communicating with other "smart" home appliances. For example, the wall-mounted home-automation device can "talk" with the electrical kettle and stove to obtain their status. Moreover, the wall-mounted home-automation device can send commands to the electrical kettle and stove to adjust their settings. In another example, the wall-mounted home-automation device can "talk" with the "smart" doorbell, thus sensing that a package has been delivered to the door. The wall-mounted home-automation device can then send, via its network interface, a text message or an email to the user.

As discussed previously, in addition to detecting user events, the wall-mounted home-automation device can control the operations or status of various in-home devices based on the detected user event. More specifically, the wall-mounted home-automation device can generate various types of output that can be used to control other in-home devices. The output generated by the wall-mounted home-automation device can include but is limited to: sounds, IR signals, RF signals, and control commands sent via various network interfaces. For example, the wall-mounted home-automation device can communicate with Z-Wave-enabled in-home devices (e.g., doorbells, light dimmers, ceiling fans, etc.) via a Z-Wave interface. Alternative network interfaces, such as Ethernet/IP, WiFi, Cellular, Bluetooth, and ZigBee, can also be used to send the control commands to corresponding in-home devices. Alternatively, the wall-mounted home-automation device can directly output sound, IR, or RF signals to in-home devices to control their operation.

Figure 11:
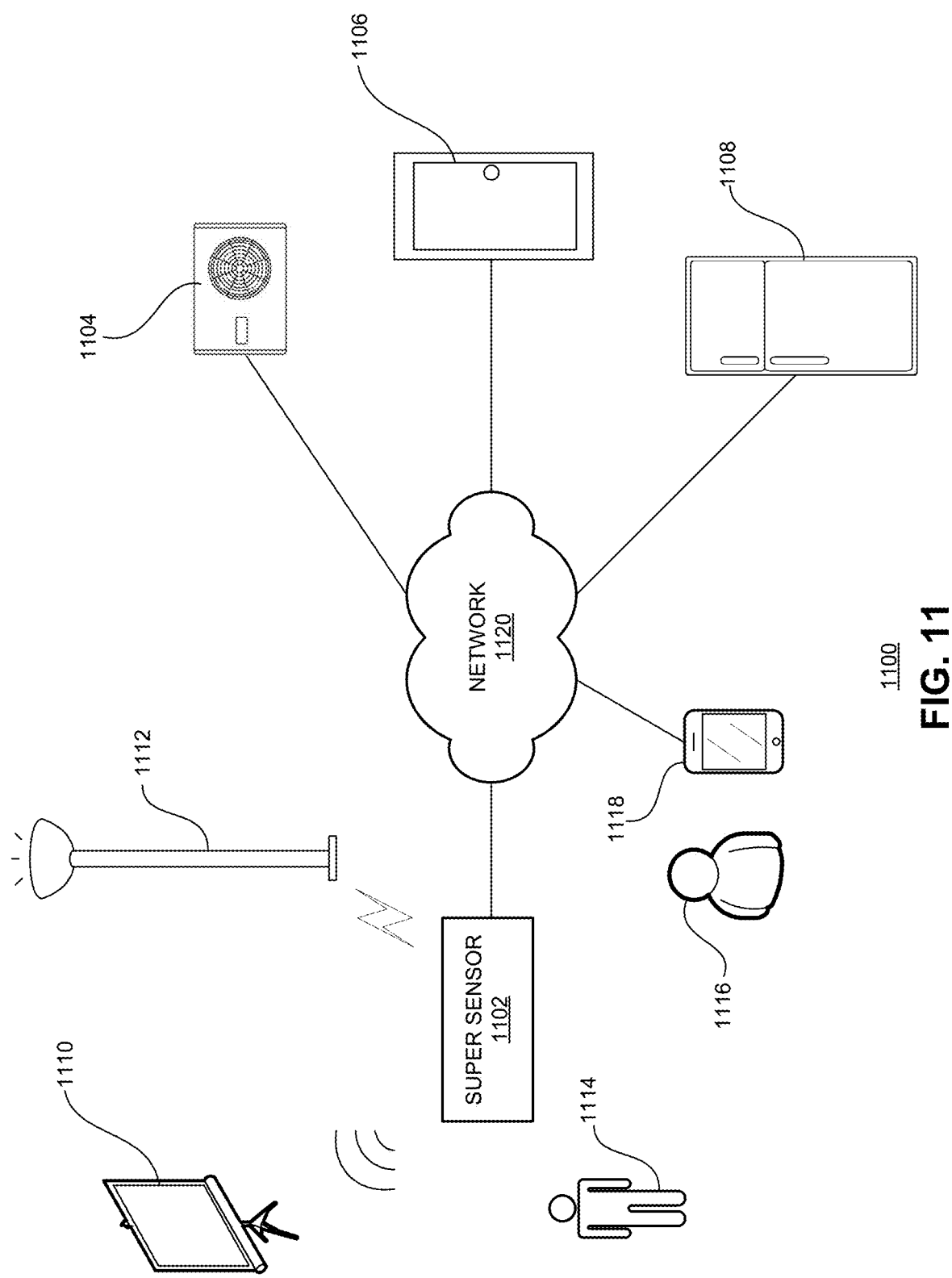
FIG. 11 shows an exemplary smart home with a wall-mounted home-automation device, according to one embodiment.

FIG. 11 shows an exemplary smart home with a wall-mounted home-automation device, according to one embodiment. In FIG. 11, smart home 1100 has installed on its wall wall-mounted home-automation device 1102 and a number of in-home appliances that are Z-Wave enabled, such as air conditioner 1104, a "smart" door bell installed on door 1106, and refrigerator 1108. Smart home 1100 can also include other in-home appliances, such as TV 1110 and light 1112.

Through network 1120, wall-mounted home-automation device 1102 can communicate with the network-enabled appliances and sensors. For example, based on output of a temperature sensor included in wall-mounted home-automation device 1102, wall-mounted home-automation device 1102 can send control commands to air conditioner 1104, such as turning it on or off or adjusting its settings. Similarly, wall-mounted home-automation device 1102 can receive input (e.g., video frames or still pictures) from the "smart" doorbell installed on door 1106. Based on the received input, wall-mounted home-automation device 1102 can perform facial recognition to determine the identity of a person ringing the doorbell or determine that a package has been left by the front door. Network 1120 can include different types of networks, such as a Wi-Fi network, a Bluetooth network, a cellular network, a Z-Wave network, a ZigBee network, etc.

In addition, wall-mounted home-automation device 1102 can control a number of in-home devices in its vicinity using direct transmission of IR or RF signals. Such in-home devices may not be network-enabled. For example, wall-mounted home-automation device 1102 can send IR signals to TV 1110, which typically includes an IR receiver, in order to turn it on and off or change channels. Similarly, wall-mounted home-automation device 1102 can send an IR or RF signal to light 1112 in order to turn it on and off or dim it. In addition to IF and RF signals, wall-mounted home-automation device 1102 can also use audio signals to control in-home devices.

User 1114 can interact with wall-mounted home-automation device 1102 using various communication means, such as voice, gesture, facial expression, touch, etc. For example, user 1114 can send a voice command to wall-mounted home-automation device 1102. Wall-mounted home-automation device 1102 can first extract the voice fingerprint from the received voice command to determine whether the command is from an authorized user. If so, wall-mounted home-automation device 1102 can perform an action based on the voice command. In one example, user 1114 may say "turn on the ceiling fan" to wall-mounted home-automation device 1102, which in turn sends an IR signal to the ceiling fan (not shown in FIG. 11) to turn it on. Similarly, user 1114 can send a gesture command to wall-mounted home-automation device 1102 by pointing to TV 1110. In response to recognizing the gesture command, wall-mounted home-automation device 1102 sends an IR signal to turn on TV 1110.

In some embodiments, remote user 1116 can also interact with wall-mounted home-automation device 1102 using a computing device 1118, which can be a smartphone, a tablet computer, or any network-enabled computing devices, via network 1120. More specifically, remote user 1116 can communicate with wall-mounted home-automation device 1102 to obtain sensor states or control other in-home devices. For example, remote user 1116 may receive an alert from wall-mounted home-automation device 1102, reporting an unexpected human presence in the house. Alternatively, remote user 1116 can send a command to wall-mounted home-automation device 1102, instructing wall-mounted home-automation device 1102 to adjust the settings of air conditioner 1104 or light 1112.

Because the wall-mounted home-automation device integrates both the sensing devices and devices for output of control signals, it can reduce the interference between the input and output signals. For example, a user may speak a voice command to the wall-mounted home-automation device while a speaker is playing music. If the speaker operates independently of the wall-mounted home-automation device, the music may interfere with the user's voice command, making it harder for the wall-mounted home-automation device to understand the voice command. However, in embodiments of the present invention, because the speakers are part of the wall-mounted home-automation device, upon detecting the user entering a voice command, the wall-mounted home-automation device can stop the speakers from playing music or lower their volume, thus reducing the amount of interference.

Because the wall-mounted home-automation device can sense a wide range of environmental factors and user events, the wall-mounted home-automation device may perform an action or a sequence of actions based on compound rules, such as rules that take as input multiple environmental factors and/or user events. For example, in addition to the output of the temperature-and-humidity sensor, the wall-mounted home-automation device may adjust the settings of the AC based on the presence of human occupants and/or pets. Further, the wall-mounted home-automation device may adjust the setting of the AC based on detected user activity, such as hosting a party, cooking, or sleeping. Alternatively, different occupants may prefer different temperature settings; hence, the wall-mounted home-automation device can identify the present occupant based on voice fingerprint or facial recognition and then adjust the AC setting accordingly. If multiple occupants are present, in some embodiments, the AC settings can be adjusted in such a way that different portions of the house can have different temperatures based on locations of the occupants. Note that detecting the presence of the multiple occupants may involve analyzing output from the PIR sensor and performing face and/or voice recognition.

Similarly, in addition to using the PIR sensor output to determine user presence, the wall-mounted home-automation device may take into account other sensor output. For example, a conventional home-automation system may be configured such that when the PR sensor detects that no one is in the room, the system may turn off the light. However, in embodiments of the present invention, the wall-mounted home-automation device may determine, based on output of the sound sensor (i.e., the microphones), that although no one is present in the room, the shower in on. Hence, the user is most likely taking a shower. As a result, instead of turning off the light, the wall-mounted home-automation device will leave the light on. The ability to process output from multiple sensors and perform actions based on output from the multiple sensors enhances the performance of the wall-mounted home-automation device. In addition, the ability of the central controller to receive, simultaneously, output from multiple sensors also increases the system flexibility. One can easily adapt the wall-mounted home-automation device for various purposes. For example, additional sensors can be added to the wall-mounted home-automation device, and the wall-mounted home-automation device can control additional in-home devices via the various wired and wireless interfaces.

In general, embodiments of the present invention can provide a low-cost, compact, easy-to-install home-automation controller. More specifically, a wall-mounted home-automation device can be achieved by integrating a wide range of sensors into one physical enclosure that can be installed in-wall. The wall-mounted home-automation device can provide sensing in multiple physical domains simultaneously, thus allowing its central controller to detect a wide variety of environmental factors and user events. In some embodiments, the central controller may detect a user event based on output from multiple sensors. A user can interact with the wall-mounted home-automation device in various ways, including using voice or gesture commands. In some embodiments, the wall-mounted home-automation device may implement a machine-learning technique to recognize the user's face, facial expression, voice, or gestures. Accurate detection of user events may also require the implementation of machine-learning techniques. The wall-mounted home-automation device can include a number of signal output mechanisms that can be used to control in-home devices, including sound signals, IR signals, and RF signals. Moreover, the wall-mounted home-automation device is equipped with a number of network interfaces, thus allowing the wall-mounted home-automation device to communicate with remote devices, such as sensors or home appliances. The networking ability also enables a remote user to interact with the wall-mounted home-automation device.

The wall-mounted home-automation device can be compact in size and the physical enclosure (e.g., a wall box) for the wall-mounted home-automation device can conform to a standard form factor, thus allowing for easy in-wall installation. In addition to the central controller (which can be a single-board computer), the physical enclosure can also house a main PCB and a daughter PCB, each of which can support multiple sensors. The PCBs can be mounted to a cover for the physical enclosure along with hi-fidelity speakers. A decorative front panel can be placed on the cover, creating the desired aesthetics.

The foregoing descriptions of various embodiments have been presented only for purposes of illustration and description. They are not intended to be exhaustive or to limit the present system to the forms disclosed. Accordingly, many modifications and variations will be apparent to practitioners skilled in the art. Additionally, the above disclosure is not intended to limit the present system.

What is claimed is:

1. A home-automation system, comprising:
   a mechanical supporting structure and a cover plate forming a physical enclosure; and
   a plurality of components positioned inside the physical enclosure;
   wherein the plurality of components comprise at least:
      a central controller;
      a main printed circuit board (PCB) positioned between the central controller and the cover plate;
      a daughter PCB positioned between the main PCB and the cover plate, wherein the daughter PCB is electrically coupled to the main PCB, and wherein the daughter PCB and the main PCB are coupled to the cover plate; and a plurality of sensors mounted on the daughter PCB, wherein at least one sensor is exposed to an environment outside of the physical enclosure via an opening on the cover plate;

wherein the central controller is configured to receive, simultaneously, outputs from the plurality of sensors mounted on the daughter PCB and to detect a user event based on simultaneous outputs of at least two different sensors, each sensor configured to sense parameters in a different physical domain.

2. The home-automation system of claim 1, wherein the central controller comprises a single-board computer mounted on a back surface of the mechanical supporting structure.

3. The home-automation system of claim 1, further comprising at least one speaker positioned within the physical enclosure.

4. The home-automation system of claim 1, wherein the plurality of sensors comprise one or more of:
a passive infrared (PIR) sensor;
a camera;
an ambient light sensor;
one or more microphones; and
a temperature-and-humidity sensor.

5. The home-automation system of claim 1, wherein the plurality of components further comprise one or more of:
a plurality of red-green-blue light-emitting diodes; and
at least one infrared light-emitting diode.

6. The home-automation system of claim 1, wherein at least one PCB comprises one or more of:
a general-purpose input-output (GPIO) header comprising a plurality of GPIO pins;
one or more Ethernet™ connectors;
an inter-integrated circuit (I²C™) breakout; and
a mezzanine PCB connector.

7. The home-automation system of claim 1, further comprising a decorative front panel, wherein the front panel comprises a plurality of openings for exposing the plurality of sensors.

8. The home-automation system of claim 1, wherein while detecting the user event, the central controller is configured to perform at least one of:
detecting a user presence;
recognizing a face;
recognizing a voice;
detecting an environment state;
recognizing an event;
detecting a status of an appliance; and
detecting a user activity.

9. The home-automation system of claim 1, wherein while detecting the user event, the central controller is configured to analyze output of at least a sound sensor and a light sensor.

10. The home-automation system of claim 9, wherein while detecting the user event, the central controller is further configured to analyze output of a passive infrared sensor.

11. The home-automation system of claim 1, wherein while detecting the user event, the central controller is configured to apply a machine-learning technique.

12. The home-automation system of claim 1, wherein the central controller is further configured to control an in-home device based on one or more detected user events.

13. The home-automation system of claim 12, wherein while controlling the in-home device, the central controller is configured to send a control command to the in-home device via one of:
an infrared signal;
a sound signal; and
an RF signal.

14. The home-automation system of claim 12, wherein while controlling the in-home device, the central controller is configured to send a control command to the in-home device via a network interface, in response to the in-home device being network-enabled.

15. The home-automation system of claim 14, wherein the network interface comprises one of:
a Wi-Fi™ interface;
a cellular interface;
a Bluetooth™ interface;
a Z-Wave™ interface;
a ZigBee™ interface; and
an Ethernet™ interface.

16. The home-automation system of claim 1, wherein the mechanical supporting structure comprises a 4-gang box.

17. A home-automation system, comprising:
a wall-mounted controller; and
one or more home appliances controlled by the wall-mounted controller;
wherein the wall-mounted controller comprises:
a mechanical supporting structure and a cover plate forming a physical enclosure;
a central controller positioned inside the physical enclosure;
a main printed circuit board (PCB) positioned between the central controller and the cover plate;
a daughter PCB positioned between the main PCB and the cover plate, wherein the daughter PCB is electrically coupled to the main PCB, and wherein the daughter PCB and the main PCB are mechanically attached to the cover plate; and
a plurality of sensors mounted on the daughter PCB, wherein at least one sensor is exposed to an environment outside of the physical enclosure via an opening on the cover plate;
wherein the central controller is configured to receive, simultaneously, outputs from the plurality of sensors mounted on the daughter PCB and to detect a user event based on simultaneous outputs of at least two different sensors, each sensor configured to sense parameters in a different physical domain.

18. The home-automation system of claim 17, wherein the wall-mounted controller is configured to send a control command to the one or more home appliances via one of:
an infrared interface;
an audio interface;
an RF interface; and
a computer network interface, which comprises one or more of:
a Wi-Fi™ interface,
a cellular interface,
a Bluetooth™ interface,
a Z-Wave™ interface,
a ZigBee™ interface, and
an Ethernet™ interface.

19. A computer-executive method for home-automation, the method comprising:
receiving, simultaneously at a central controller, sensor data from a plurality of sensors mounted onto one or more printed circuit boards (PCBs), wherein the central controller and the PCBs are positioned inside a physical enclosure formed by a mechanical supporting structure and a cover plate, wherein the PCBs comprise a main PCB positioned between the central controller and the cover plate and a daughter PCB positioned between the main PCB and the cover plate, wherein the daughter PCB is electrically coupled to the main PCB, wherein the daughter PCB and the main PCB are coupled to the cover plate, wherein the plurality of sensors are mounted on the daughter PCB, wherein at least one sensor is exposed to an environment outside of the physical enclosure via an opening on the cover plate, and wherein each sensor is configured to sense parameters in a different physical domain; and detecting, by the central controller, a user event based on the simultaneously received sensor data from at least two different sensors.

\* \* \* \* \*